United States Patent
Baryudin et al.

(10) Patent No.: US 9,753,869 B2
(45) Date of Patent: *Sep. 5, 2017

(54) TECHNIQUES FOR SECURE STORAGE HIJACKING PROTECTION

(71) Applicant: Seagate Technology LLC, Cupertino, CA (US)

(72) Inventors: Leonid Baryudin, San Jose, CA (US); Timothy Joseph Markey, San Jose, CA (US); Dmitry Obukhov, Novato, CA (US)

(73) Assignee: Seagate Technology LLC, Cupertino, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/803,433

(22) Filed: Jul. 20, 2015

(65) Prior Publication Data

US 2015/0324304 A1 Nov. 12, 2015

Related U.S. Application Data

(63) Continuation of application No. 14/131,665, filed as application No. PCT/US2012/048265 on Jul. 26, 2012, now Pat. No. 9,087,210.
(Continued)

(51) Int. Cl.
*G06F 12/14* (2006.01)
*G06F 21/44* (2013.01)
(Continued)

(52) U.S. Cl.
CPC .......... *G06F 12/1425* (2013.01); *G06F 21/44* (2013.01); *G06F 21/6218* (2013.01);
(Continued)

(58) Field of Classification Search
CPC .. G06F 12/1425; G06F 21/44; G06F 21/6218; G06F 21/78; G06F 2212/202;
(Continued)

(56) References Cited

U.S. PATENT DOCUMENTS 7,054,990 B1 * 5/2006 Tamura ............... G06F 12/1466
711/103
7,155,745 B1 12/2006 Shin et al.
(Continued)

FOREIGN PATENT DOCUMENTS

JP 2005157542 A 6/2005
JP 2006318472 A 11/2006
(Continued)

OTHER PUBLICATIONS

International Search Report and Written Opinion in the parent PCT/US2012/048265, 8 pps.

*Primary Examiner* — Matthew Smithers
(74) *Attorney, Agent, or Firm* — Hall Estill Attorneys at Law

(57) ABSTRACT

Various embodiments of the present disclosure are directed to a storage device having a non-volatile memory, a Proof of Physical Access (PPA) mechanism and a controller circuit. The PPA mechanism generates a PPA value responsive to a direct physical user interaction with the storage device by a user. In response to receipt of a storage command from a host, the controller circuit executes the received storage command responsive to the storage command being determined to be a protected command and responsive to detection of the PPA value during a predetermined window of time. The controller circuit does not execute the received storage command responsive to the storage command being determined to be a protected command and responsive to an absence of the PPA value during the predetermined window
(Continued)

of time. The protected command is a command that changes access to data stored in the non-volatile memory.

20 Claims, 5 Drawing Sheets

Related U.S. Application Data

(60) Provisional application No. 61/511,989, filed on Jul. 27, 2011.

(51) Int. Cl.
  *G06F 21/78* (2013.01)
  *G06F 21/62* (2013.01)
  *G06F 3/06* (2006.01)

(52) U.S. Cl.
  CPC .............. *G06F 21/78* (2013.01); *G06F 3/062* (2013.01); *G06F 3/0659* (2013.01); *G06F 3/0679* (2013.01); *G06F 2212/1052* (2013.01); *G06F 2212/202* (2013.01)

(58) Field of Classification Search
  CPC ............. G06F 2212/1052; G06F 3/062; G06F 3/0659; G06F 3/0679; G06F 3/0622; G06F 3/0637; G06F 21/6209
  See application file for complete search history.

(56) References Cited

U.S. PATENT DOCUMENTS

| | | |
|---|---|---|
| 7,690,030 B1 | 3/2010 | Ma et al. |
| 8,166,220 B2 | 4/2012 | Ben-Yacov et al. |
| 2005/0216794 A1 | 9/2005 | Yagawa |
| 2006/0168395 A1 | 7/2006 | Deng et al. |
| 2006/0285397 A1* | 12/2006 | Nishihara ............... G06F 3/061 365/185.33 |
| 2008/0082719 A1 | 4/2008 | Chou |
| 2009/0083477 A1 | 3/2009 | Lee et al. |
| 2009/0234797 A1* | 9/2009 | Uno ........................ G06F 21/62 |
| 2009/0307452 A1 | 12/2009 | Hahn et al. |
| 2010/0030929 A1* | 2/2010 | Ben-Yacov ........... G06F 13/385 710/33 |
| 2010/0161927 A1 | 6/2010 | Sprouse |
| 2010/0169556 A1* | 7/2010 | Nakanishi ............. G06F 3/0643 711/103 |
| 2010/0238579 A1 | 9/2010 | Saito |
| 2011/0191501 A1* | 8/2011 | Jang ........................ G06F 3/00 710/9 |
| 2011/0258456 A1 | 10/2011 | Lyakhovitskly |
| 2011/0307709 A1 | 12/2011 | Cox et al. |
| 2012/0089854 A1* | 4/2012 | Breakstone ............... G06F 1/30 713/323 |
| 2013/0145106 A1* | 6/2013 | Kan ..................... G06F 3/0659 711/147 |
| 2014/0040639 A1 | 2/2014 | Raam |
| 2014/0082225 A1 | 3/2014 | Lin |

FOREIGN PATENT DOCUMENTS

| | | |
|---|---|---|
| JP | 2007220038 A | 8/2007 |
| JP | 2008512738 A | 4/2008 |
| JP | 2010092301 A | 4/2010 |

\* cited by examiner

TECHNIQUES FOR SECURE STORAGE HIJACKING PROTECTION

RELATED APPLICATIONS

This application is a continuation of co-pending U.S. patent application Ser. No. 14/131,665 filed on Jan. 8, 2014, which issued as U.S. Pat. No. 9,087,210 on Jul. 21, 2015 and which is a national phase entry application under 35 USC 371 of PCT/US2012/048265 filed Jul. 26, 2012, which in turn makes a claim of domestic priority to U.S. Provisional Patent Application No. 61/511,989 filed Jul. 27, 2011, the contents of which are hereby incorporated by reference.

BACKGROUND

Field

Advancements in secure storage technology are needed to provide improvements in performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, including as a process, an article of manufacture, an apparatus, a system, a composition of matter, and a computer readable medium such as a computer readable storage medium (e.g., media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

LIST OF REFERENCE SYMBOLS IN DRAWINGS

Figure 1A:
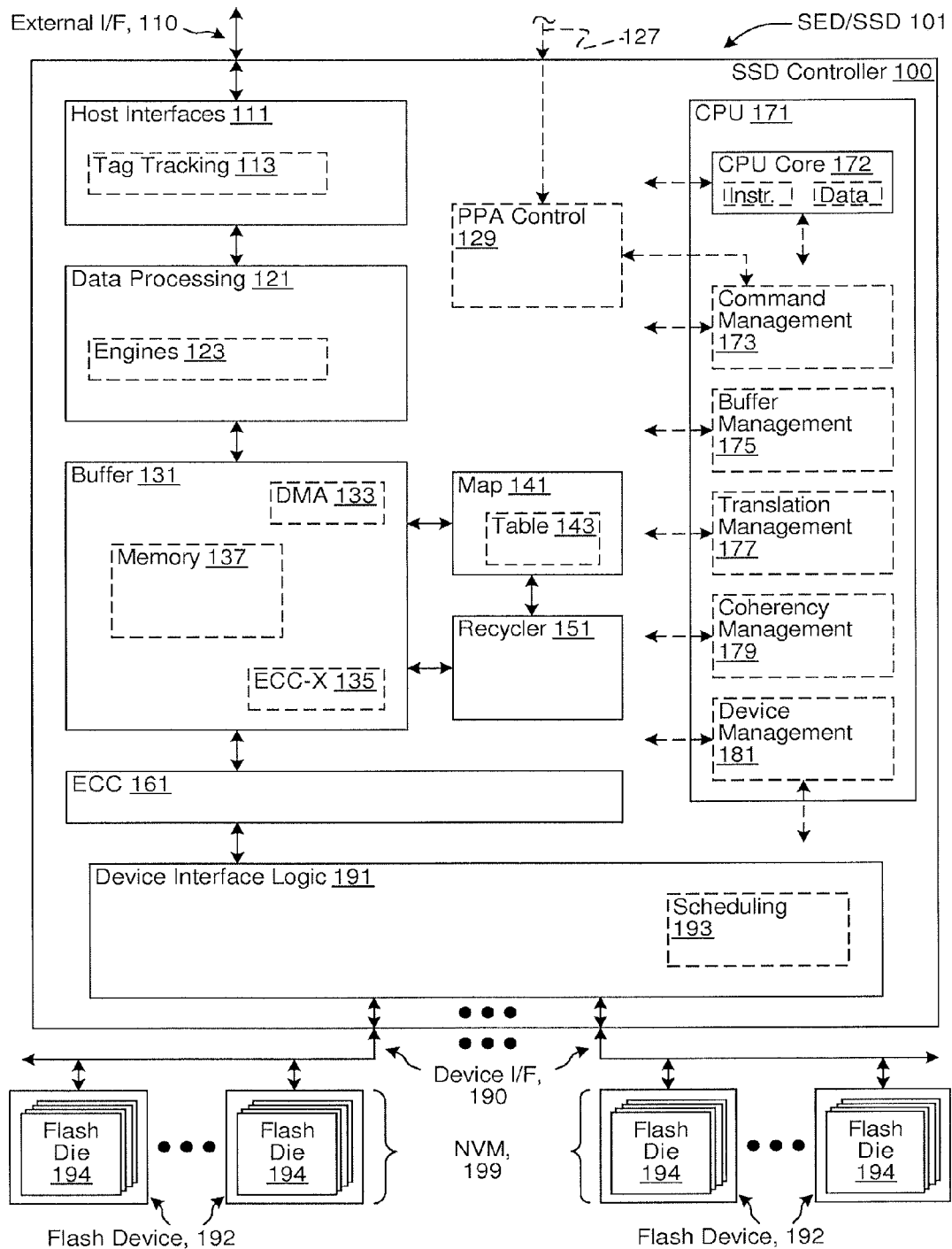
FIG. 1A illustrates selected details of an embodiment of a Solid-State Disk/Self-Encrypting Drive (SED/SSD) including an SSD controller having inputs from a user-actuated Proof of Physical Access (PPA).

| Ref. Symbol | Element Name |
|---|---|
| 100 | SSD controller |
| 101 | SED/SSD |
| 102 | Host |
| 103 | Intermediate controller |
| 104 | Intermediate interfaces |
| 110 | External interfaces |
| 111 | Host interface |
| 113 | Tag tracking |
| 121 | Data processing |
| 123 | Engine(s) |
| 125 | PA sensor (generic) |
| 125A | PPA sensor (magnetically operated reed switch) |
| 125B | PPA sensor (momentary switch) |
| 125C | PPA sensor (radio receiver) |
| 125D | PPA sensor (generic) |
| 127 | PPA connection |
| 129 | PPA control |
| 131 | Buffer |
| 133 | DMA |
| 135 | ECC-X |
| 137 | Memory |
| 141 | Map |
| 143 | Table |
| 150 | User |
| 151 | Recycler |
| 153 | User interaction with host |
| 155 | User proof interaction |
| 157 | Actuator |
| 159 | Predetermined proof action |
| 161 | ECC |
| 171 | CPU |
| 172 | CPU core |
| 173 | Command management |
| 175 | Buffer management |
| 177 | Translation management |
| 179 | Coherency management |
| 181 | Device management |

| Ref. Symbol | Element Name |
|---|---|
| 190 | Device interfaces |
| 191 | Device interface logic |
| 193 | Scheduling |
| 194 | Flash die |
| 199 | NVM |
| 200 | Establishing ownership, generally |
| 202 | Host BIOS |
| 204 | Host pre-boot authentication |
| 206 | Dashed arrow (conceptual indication of BIOS to SED/SSD password communication) |
| 208 | User provides proof of physical access |
| 300 | Enabling/Unlocking, generally |
| 301 | Execute all CMDs |
| 302 | Execute all unprotected CMDs; execute protected CMDs only when PPA present |
| 303 | Wait for correct Credentials to unlock |
| 400 | Decision tree, generally |
| 402 | Storage device command received |
| 404 | Test for Security Enabled |
| 406 | Received command executed |
| 408 | Report status to host |
| 410 | Test for Protected Command |
| 412 | Test for PPA Present |
| 414 | Test for Timed Out |
| 416 | Report Error Status to host |
| 502 | Magnetically controlled reed switch |
| 504 | User-manipulated external magnet |
| 506 | Momentary switch |
| 508 | User-manipulated needle-like rod |
| 510 | Compatible radio-frequency receiver/detector |
| 512 | External user-manipulated radio-frequency transmitter |
| 514 | Light sensor |
| 516 | Light source |
| 518 | User-manipulated light source interrupter |
| 520 | Physically secure connection |
| 521 | Host to physically secure connection coupling |
| 523 | Physically secure connection to SED/SSD coupling |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations (e.g. acronyms) defined here refer to certain elements used herein.

| Acronym | Description |
|---|---|
| AES | Advanced Encryption Standard |
| ASCII | American Standard Code for Information Interchange |
| BCH | Bose Chaudhuri Hocquenghem |
| BIOS | Basic Input/Output System |
| CD | Compact Disk |
| CF | Compact Flash |
| CMOS | Complementary Metal Oxide Semiconductor |
| CPU | Central Processing Unit |
| CRC | Cyclic Redundancy Check |
| DDR | Double-Data-Rate |
| DES | Data Encryption Standard |
| DMA | Direct Memory Access |
| DVD | Digital Versatile/Video Disk |
| ECC | Error-Correcting Code |
| eSATA | external Serial Advanced Technology Attachment |
| HDD | Hard Disk Drive |
| IC | Integrated Circuit |
| IDE | Integrated Drive Electronics |
| IEEE | Institute of Electrical and Electronics Engineers |
| JPEG | Joint Photographic Experts Group |
| LBA | Logical Block Address |
| LDPC | Low-Density Parity-Check |
| LPN | Logical Page Number |
| LZ | Lempel-Ziv |
| MLC | Multi-Level Cell |
| MMC | MultiMediaCard |
| MPEG | Moving Picture Experts Group |
| NCQ | Native Command Queuing |
| NDK | Non-Deterministic Key |
| NVM | Non-Volatile Memory |
| ONFI | Open NAND Flash Interface |
| PC | Personal Computer |
| PCIe | Peripheral Component Interconnect express (PCI express) |
| PDA | Personal Digital Assistant |
| PPA | Proof of Physical Access |
| RAID | Redundant Array of Inexpensive/Independent Disks |
| RS | Reed-Solomon |
| RSA | Rivest, Shamir & Adleman |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SED | Self-Encrypting Drive |
| SLC | Single-Level Cell |
| SMART | Self-Monitoring Analysis and Reporting Technology |
| SPB | Secure Physical Boundary |
| SSD | Solid-State Disk/Drive |
| TCG | Trusted Computing Group |

-continued

| Acronym | Description |
|---|---|
| UART | Universal Asynchronous Receiver Transmittal |
| USB | Universal Serial Bus |

A problem exists with respect to unlocked secure storage devices such as HDDs, SSDs, network devices with internal storage, intelligent appliances, and the like. A new secure storage device is normally unlocked—either secure procedures have not yet been enabled, or the device is using publicly known default credentials. To prevent valuable data from being lost or hijacked, a user takes ownership of the secure storage device by enabling secure procedures and/or by replacing publicly known default credentials with user-supplied private credentials as soon as possible (such as before saving any data to the secure storage device).

If the ownership is not taken-provided that the secure storage device is connected to a network-then a remote intruder, under some circumstances (e.g. employing malicious software), is able to read the data and/or erase the data (e.g. via a conventional erase procedure or via a sanitizing or trim procedure that in some circumstances is quicker than a conventional erase procedure). The remote intruder is also able to enable the security procedures, and/or replace the default credentials with his own. Thus the remote intruder takes ownership of the secure storage device. The user then has no ability to access the secure storage device, as it has been "hijacked" by the remote intruder, even while the user has retained physical possession. To recover ownership (and hence control) over the secure storage device, the user resets the device to a default state, thus losing all previously stored data, and in some circumstances incurring substantial financial and/or other losses.

In some scenarios, if customer education lags the advance of technological innovations, then the number of persons and businesses vulnerable to such attacks will continue to grow in the immediate future as more and more devices with secure storage reach the market.

Hereinafter the terms "device" and "storage device" are to be understood as referring to a "secured storage device" or a device having secured storage. A "secured drive" is an example of a secured storage device.

An anti-hijacking technique overcomes the problem by recognizing, once security has been enabled, a protected class of storage device commands. The protected commands include, "Change Existing Credentials," "Format Drive," "Erase Specified Portions of Drive," "Sanitize and Trim," any combination thereof, and the like. Execution of the protected commands is conditional upon a direct user intervention proving the user has actual physical possession of the device. As a result, a remote intruder, who does not have physical possession of the storage device, and is thus unable to provide such proof, is prevented from using the protected commands.

Various forms of such proof are contemplated, and include defining a "proof" window that the direct user intervention must occur in, and in some scenarios, to defining specific sequences of user interaction. Example techniques include placing a magnetically operated reed switch within the storage device and having the user operate the switch at an appropriate time by manipulating a magnet near the storage device in a predetermined manner. An alternative technique is to place a basic radio receiver inside the storage device and having the user move a cell phone near the device in some predefined manner during an appropriate time. The foregoing examples provide an introduction to how physical access to a storage device is proved, such as by various intentional actions of the user. Other techniques for proving physical access are equally suitable.

In various embodiments, an SED/SSD controller includes a host interface for interfacing with a computing host, a flash interface for interfacing with flash memory, and circuitry for controlling the interfaces and performing (and/or controlling various aspects of the performing) compressing and uncompressing, as well as lower-level error correction, higher-level error correction, and dynamic higher-level redundancy mode management with independent silicon elements.

According to various embodiments, some host interfaces are compatible with one or more of a USB interface standard, a CF interface standard, an MMC interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a PC, a laptop computer, a notebook computer, a netbook computer, a PDA, a media player, a media recorder, a digital camera, a cellular handset, a cordless telephone handset, and an electronic game. In some embodiments, an interfacing host (such as an SAS/SATA bridge) operates as a computing host and/or as a bridge to a computing host.

According to various embodiments, some SED/SSDs are compatible with form-factors, electrical interfaces, and/or protocols used by magnetic and/or optical non-volatile storage, such as HDDs, CD drives, and DVD drives. In various embodiments, SED/SSDs use various combinations of zero or more parity codes, zero or more RS codes, zero or more BCH codes, zero or more Viterbi or other trellis codes, and zero or more LDPC codes.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1) A method comprising:
  in a storage device, receiving a command from a host; and
  in response to the command being one of a plurality of types of protected storage commands, performing the command conditionally, such that the command is performed only when Proof of Physical Access (PPA) of the storage device is
  present and otherwise not performed.

EC2) The method of EC1, wherein the plurality of types of protected storage commands comprises at least one of:
  changing security credentials;
  formatting the storage device;
  sanitizing the storage device;
  erasing contents of a designated portion of the storage device; and
  a solid-state drive TRIM command.

EC3) The method of Ee1, wherein the PPA comprises the storage device being connected to a host system via a physically secure connection.

EC4) The method of EC1, wherein the PPA is independent of a host system and is independent of storage device firmware.

EC5) The method of EC4, wherein the PPA comprises a predetermined physical intervention at the storage device.

EC6) The method of EC5, wherein the PPA and the predetermined physical intervention respectively comprise at least one of:
- detecting operation of a reed switch of the storage device, and manipulating a magnet in a predetermined manner to control the reed switch;
- detecting operation of a manually operated switch of the storage device, and manually operating the manually operated switch in a predetermined manner;
- detecting presence of a predetermined radio-frequency signal at the storage device, and providing the predetermined signal; and
- detecting a predetermined change in a received light source at the storage device, and creating the predetermined change.

EC7) The method of EC1, wherein the storage device is protected by a security protocol such as TCG (Enterprise and Opal), and IEEE 1667.

EC8) The method of EC1, wherein the storage device comprises a self-encrypting drive.

EC9) The method of EC8, wherein the self-encrypting drive comprises a solid-state drive.

EC10) The method of EC1, wherein the receiving is via a storage interface compatible with a storage interface standard.

EC11) The method of EC1, wherein the presence of PPA is implemented, at least in part, via a controller of a solid-state drive.

EC12) The method of EC1, wherein the receiving and the performing are implemented, at least in part, via a controller of a solid-state drive.

EC13) A method comprising:
in a self-encrypting storage device, receiving a command from a host;
determining whether the command is one of a plurality of protected storage commands, and if so, then executing the command only if a defined user physical intervention at the storage device occurs during a defined window of time with respect to receipt of the command.

EC14) The method of EC13, wherein the defined user physical intervention comprises activating, in a predetermined manner, a proof sensor located in the storage device.

EC15) The method of EC14, wherein the activating a proof sensor comprises manipulating a magnet to operate a reed switch located within the storage device in a predetermined manner, and the operation of the reed switch controls the executing of the command.

EC16) The method of EC14, wherein the activating a proof sensor comprises operating a momentary switch located within the storage device in a predetermined manner, and the operation of the momentary switch controls the executing of the command.

EC17) The method of EC14, wherein the activating a proof sensor comprises manipulating in a predetermined manner light reaching a photo sensor located within the storage device, and detection of the light manipulation by the photo sensor controls the executing of the command.

EC15) The method of EC14, wherein the activating a proof sensor comprises manipulating a radio transmitter in a predetermined manner near a radio receiver located within the storage device, and detection of the radio transmitter manipulation by the radio receiver controls the executing of the command.

EC19) The method of EC15, wherein the radio transmitter is a cellular phone and the radio receiver is compatible with cellular phone transmission of the cellular phone.

EC20) A computer readable medium having a set of instructions stored therein that when executed by a processing element cause the processing element to perform operations comprising:
managing receiving of a storage command by a storage device, the storage command being from a host; and
managing determining if the storage command is one of a plurality of types of protected storage commands, and if so, then performing the command only if Proof of Physical Access (PPA) of the storage device is present.

EC21) A computer readable medium having a set of instructions stored therein that when executed by a processing element cause the processing element to perform operations comprising:
managing receiving of a storage command by a storage device, the storage command being from a host; and
determining if the command is one of a plurality of types of protected storage commands, and if so, then performing the storage command only if Proof of Physical Access (PPA) of the storage device is present.

EC22) The computer readable medium of EC20 or EC21, wherein the PPA comprises a predetermined user-created physical change within the storage device.

EC23) The computer readable medium of EC22, wherein the predetermined user-created physical change comprises anyone or more of:
a change in state of a reed switch located within the storage device due to user manipulation of a magnet;
a change in state of an electrical switch located within the storage device due to user operation of the electrical switch;
a change in state of a radio receiver located within the storage device due to user manipulation of a radio transmitter to provide a predetermined radio signal to the radio receiver;
a change in state of a light sensor located within the storage device due to user control of a light source; and a change in state of an illumination sensor located within the storage device due to user opening and/or closing of a cover of a laptop computer.

EC24) An apparatus comprising:
host interface circuitry enabled to receive one or more storage commands from a host;
Proof of Physical Access (PPA) control circuitry enabled to determine presence of PPA; and
wherein respective protected ones of the received commands are performed only when the PPA circuitry has determined that the PPA is present.

EC25) The apparatus of EC24, wherein the protected received commands comprise one or more of anyone or more
security credential changing storage commands;
storage device formatting storage commands;
storage device sanitizing storage commands;
content erasing storage commands; and
solid-state drive TRIM commands.

EC26) The apparatus of EC24, wherein the PPA comprises a predetermined user-created physical change within a storage device comprising the host interface circuitry and the PPA control circuitry.

EC27) The apparatus of EC26, wherein the predetermined user-created physical change comprises anyone or more of a change in state of a reed switch located within the storage device due to user manipulation of a magnet;

a change in state of an electrical switch located within the storage device due to user operation of the electrical switch;

a change in state of a radio receiver located within the storage device due to user manipulation of a radio transmitter to provide a predetermined radio signal to the radio receiver;

a change in state of a light sensor located within the storage device due to user control of a light source; and a change in state of an illumination sensor located within the storage device due to user opening and/or closing of a cover of a laptop computer.

EC28) The apparatus of EC27, further comprising flash interface circuitry enabled to interface to one or more flash memories and to carry out operations relating to at least one of the performed commands.

EC29) The apparatus of EC28, wherein the apparatus is a controller of a solid-state drive.

EC30) The apparatus of EC28, further comprising the flash memories and wherein the apparatus is one of a hard disk drive, a solid-state drive, a network device with internal storage, and an intelligent appliance.

EC31) The apparatus of EC27, wherein the apparatus is one of a hard disk drive, a solid-state drive, a network device with internal storage, and an intelligent appliance.

EC32) A system comprising:

a means in a storage device for receiving a command from a host;

a means for determining whether the command is one of a plurality of protected storage commands;

a means for determining whether Proof of Physical Access (PPA) of the storage device is present; and a means for conditionally executing a protected storage command only if PPA to the storage device is present.

EC33) The system of EC32, further comprising a means for unconditionally executing non-protected storage commands.

EC34) The system of EC32, wherein the PPA determining means comprises a predetermined user-created physical change within the storage device.

EC35) The system of EC34, wherein the predetermined user-created physical change comprises a user manipulating a magnet that operates a reed switch located within the storage device.

EC36) The system of EC34, wherein the predetermined user-created physical change comprises a user operating an electrical switch located within the storage device.

EC37) The system of EC34, wherein the predetermined user-created physical change comprises a user manipulating a radio transmitter to provide a predetermined radio signal to a radio receiver located within the storage device.

EC38) The system of EC37, wherein the radio transmitter is comprised in a cell phone.

EC39) The system of EC34, wherein the predetermined user-created physical change comprises a user controlling a light source means enabled to illuminate a light sensing means located within the storage device and for detecting a change in light from the light source due to the user controlling the light source means.

EC40) The system of EC34, wherein the predetermined user-created physical change comprises opening or closing a cover of a laptop computer to change an amount of ambient light illuminating a light sensor means located within the storage device for detecting a change in received light.

EC41) The system of EC32, wherein the PPA determining means comprises a secure physical connection between the storage device and the host.

EC42) The system of EC32, wherein the means are implemented, at least in part, via a controller of a Solid-State Disk (SSD).

EC43) The system of EC42, further comprising a means for interfacing the controller with the host.

EC44) The system of EC43, wherein the means for interfacing is compatible with a storage interface standard.

EC45) The system of EC43, further comprising all or any portions of the host.

EC46) The system of EC42, further comprising a means for interfacing with non-volatile memories.

EC47) The system of EC46, wherein the means for interfacing comprises a flash memory interface.

EC48) The system of EC42, further comprising one or more non-volatile memories.

EC49) The system of EC42, further comprising:

a means for interfacing requests from the host, the requests relating to information stored in non-volatile memories; and a means for interfacing to the non-volatile memories.

EC50) The system of EC49, wherein the means are collectively implemented in a single Integrated Circuit (IC).

EC51) The system of EC49, wherein the means are comprised in the SSD.

EC52) The system of EC42, wherein the SSD controller is implemented in a single Integrated Circuit (IC).

EC53) The system of EC48, wherein the SSD controller and the non-volatile memories are comprised in an self-encrypting solid-state drive.

EC54) The system of EC48, wherein at least one of the non-volatile memories comprises one or more flash memories.

EC55) The system of EC54, wherein at least one of the flash memories comprises one or more of NAND flash technology storage cells, and NOR flash technology storage cells.

EC56) The system of EC54, wherein at least one of the flash memories comprises one or more of Single-Level Cell (SLC) flash technology storage cells, and Multi-Level Cell (MLC) flash technology storage cells.

EC57) The system of EC47, wherein the flash memory interface is compatible with one or more of an Open NAND Flash Interface (ONF!), a Toggle-mode interface, a Dual Data Rate (DDR) synchronous interface, a synchronous interface, and an asynchronous interface.

EC58) The system of EC44, wherein the storage interface standard comprises one or more of a Universal Serial Bus (USB) interface standard, a Compact Flash (CF) interface standard, a MultiMediaCard (MMC) interface standard,
a Secure Digital (SD) interface standard,
a Memory Stick interface standard,
an xD-picture card interface standard,
an Integrated Drive Electronics (IDE) interface standard,
a Serial Advanced Technology Attachment (SATA) interface standard,
an external SATA (eSATA) interface standard,
a Small Computer System Interface (SCSI) interface standard,
a Serial Attached Small Computer System Interface (SAS) interface standard,
a Fibre Channel interface standard,
an Ethernet interface standard, and
a Peripheral Component Interconnect express (PCIe) interface standard.

EC59) The system of EC45, wherein the host comprises one or more of
a computer,
a workstation computer,
a server computer,
a storage server,
a Personal Computer (PC),
a laptop computer,
a notebook computer,
a netbook computer,
a Personal Digital Assistant (PDA),
a media player,
a media recorder,
a digital camera,
a cellular handset,
a cordless telephone handset, and
an electronic game.

System

FIG. 1A illustrates selected details of an embodiment of a Solid-State Disk/Self-Encrypting Drive (SED/SSD) including an SSD controller having inputs from a user-actuated Proof of Physical Access (PPA). SSD controller 100 is communicatively coupled via one or more external interfaces 110 to a host (not illustrated). According to various embodiments, external interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD controller 100 includes a SATA interface and a PCIe interface.

SSD controller 100 is further communicatively coupled via one or more device interfaces 190 to NVM 199 including one or more storage devices, such as instances of flash device 192. According to various embodiments, device interfaces 190 are one or more of: an asynchronous interface; a synchronous interface; a DDR synchronous interface; an ONFI compatible interface, such as an ONPI 2.2 or ONFI 3.0 compatible interface; a Toggle-mode compatible flash interface; a non-standard version of any of the preceding interfaces; a custom interface; or any other type of interface used to connect to storage devices.

Each instance of flash device 192 has, in some embodiments, one or more individual flash die 194. According to type of a particular one of flash device 192, a plurality of flash die 194 in the particular flash device 192 are optionally and/or selectively accessible in parallel. Flash device 192 is merely representative of one type of storage device enabled to communicatively couple to SSD controller 100. In various embodiments, any type of storage device is usable, such as an SLC NAND flash memory, MLC NAND flash memory, NOR flash memory, read-only memory, static random access memory, dynamic random access memory, ferromagnetic memory, phase-change memory, racetrack memory, or any other type of memory device or storage medium.

According to various embodiments, device interfaces 190 are organized as: one or more busses with one or more instances of flash device 192 per bus; one or more groups of busses with one or more of flash device 192 per bus, where busses in a group are generally accessed in parallel; or any other organization of one or more instances of flash device 192 onto device interfaces 190.

Continuing in FIG. 1A, SSD controller 100 has one or more modules, such as host interfaces 111, data processing 121, PPA control 129, buffer 131, map 141, recycler 151, ECC 161, device interface logic 191, and CPU 171. In some embodiments, SSD controller 100 includes an external coupling (e.g. a pin) to enable communication between PPA control 129 and an external input (such as a sensor). The external coupling is illustrated as PPA connection 127. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more host interfaces 111 to provide dual-porting. In a second example, in some embodiments, data processing 121 and/or ECC 161 are combined with buffer 131. In a third example, in some embodiments, host interfaces 111 is directly coupled to buffer 131, and data processing 121 optionally and/or selectively operates on data stored in buffer 131. In a fourth example, in some embodiments, device interface logic 191 is directly coupled to buffer 131, and ECC 161 optionally and/or selectively operates on data stored in buffer 131. In a fifth example, in some embodiments, command management 173 is coupled to PPA control 129. For example, command management 173 is representative of instructions stored, e.g., in NVM 199, and executed by CPU core 172 that are responsive to PPA control 129, and deny/grant access to protected commands based on PPA.

Host interfaces 111 sends and receives commands and/or data via external interfaces 110, and, in some embodiments, tracks progress of individual commands via tag tracking 113. For example, the commands include a read command specifying an address (such as an LBA) and an amount of data (such as a number of LBA quanta, e.g., sectors) to read; in response the SSD provides read status and/or read data. For another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, host interfaces 111 is compatible with a SATA protocol and, using NCQ commands, is enabled to have up to 32 pending commands, each with a unique tag represented as a number from 0 to 31. In some embodiments, tag tracking 113 is enabled to associate an external tag for a command received via external interfaces 110 with an internal tag used to track the command during processing by SSD controller 100.

According to various embodiments, one or more of: data processing 121 optionally and/or selectively processes some or all data sent between buffer 131 and external interfaces 110; and data processing 121 optionally and/or selectively processes data stored in buffer 131. In some embodiments, data processing 121 uses one or more engines 123 to perform one or more of: formatting; reformatting; transcoding; and any other data processing and/or manipulation task.

Buffer 131 stores data sent to/from external interfaces 110 from/to device interfaces 190. In some embodiments, buffer 131 additionally stores system data, such as some or all map tables, used by SSD controller 100 to manage one or more instances of flash device 192. In various embodiments, buffer 131 has one or more of: memory 137 used for temporary storage of data; DMA 133 used to control movement of data to and/or from buffer 131; and ECC-X 135 used to provide higher-level error correction and/or redundancy functions; and other data movement and/or manipulation functions. An example of a higher-level redundancy function is a RAID-like capability, where redundancy is at a flash device (e.g., multiple ones of flash device 192) level and/or a flash die (e.g., flash die 194) level instead of at a disk level.

According to various embodiments, one or more of: ECC 161 optionally and/or selectively processes some or all data sent between buffer 131 and device interfaces 190; and ECC 161 optionally and/or selectively processes data stored in buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device interface logic 191 controls instances of flash device 192 via device interfaces 190. Device interface logic 191 is enabled to send data to/from the instances of flash device 192 according to a protocol of flash device 192. Device interface logic 191 includes scheduling 193 to selectively sequence control of the instances of flash device 192 via device interfaces 190. For example, in some embodiments, scheduling 193 is enabled to queue operations to the instances of flash device 192, and to selectively send the operations to individual ones of the instances of flash device 192 (or flash die 194) as individual ones of the instances of flash device 192 (or flash die 194) are available.

Map 141 converts between data addressing used on external interfaces 110 and data addressing used on device interfaces 190, using table 143 to map external data addresses to locations in NVM 199. For example, in some embodiments, map 141 converts LBAs used on external interfaces 110 to block and/or page addresses targeting one or more flash die 194, via mapping provided by table 143. For LBAs that have never been written since drive manufacture or de-allocation, the map points to a default value to return if the LBAs are read. For example, when processing a de-allocation command, the map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, recycler 151 performs garbage collection. For example, in some embodiments, instances of flash device 192 contain blocks that must be erased before the blocks are re-writeable. Recycler 151 is enabled to determine which portions of the instances of flash device 192 are actively in use (e.g., allocated instead of de-allocated), such as by scanning a map maintained by map 141, and to make unused (e.g., de-allocated) portions of the instances of flash device 192 available for writing by erasing them. In further embodiments, recycler 151 is enabled to move data stored within the instances of flash device 192 to make larger contiguous portions of the instances of flash device 192 available for writing.

CPU 171 controls various portions of SSD controller 100. CPU 171 includes CPU core 172. CPU core 172 is, according to various embodiments, one or more single-core or multi-core processors. The individual processors cores in CPU core 172 are, in some embodiments, multi-threaded. CPU core 172 includes instruction and/or data caches and/or memories. For example, the instruction memory contains instructions to enable CPU core 172 to execute software (sometimes called firmware) to control SSD controller 100. In some embodiments, some or all of the firmware executed by CPU core 172 is stored on instances of flash device 192.

In various embodiments, CPU 171 further includes: command management 173 to track and control commands received via external interfaces 110 while the commands are in progress; buffer management 175 to control allocation and use of buffer 131; translation management 177 to control map 141; coherency management 179 to control consistency of data addressing and to avoid conflicts such as between external data accesses and recycle data accesses; device management 181 to control device interface logic 191; and optionally other management units. None, any, or all of the management functions performed by CPU 171 are, according to various embodiments, controlled and/or managed by hardware, by software (such as firmware executing on CPU core 172 or on a host connected via external interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD controller 100 and is compatible with operation with various computing hosts, such as via adaptation of host interfaces 111 and/or external interfaces 110. The various computing hosts include one or any combination of a computer, a workstation computer, a server computer, a storage server, a PC, a laptop computer, a notebook computer, a netbook computer, a PDA, a media player, a media recorder, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, buffer 131 is implemented on a same die as other elements of SSD controller 100. For another example, buffer 131 is implemented on a different die than other elements of SSD controller 100.

Figure 1B:
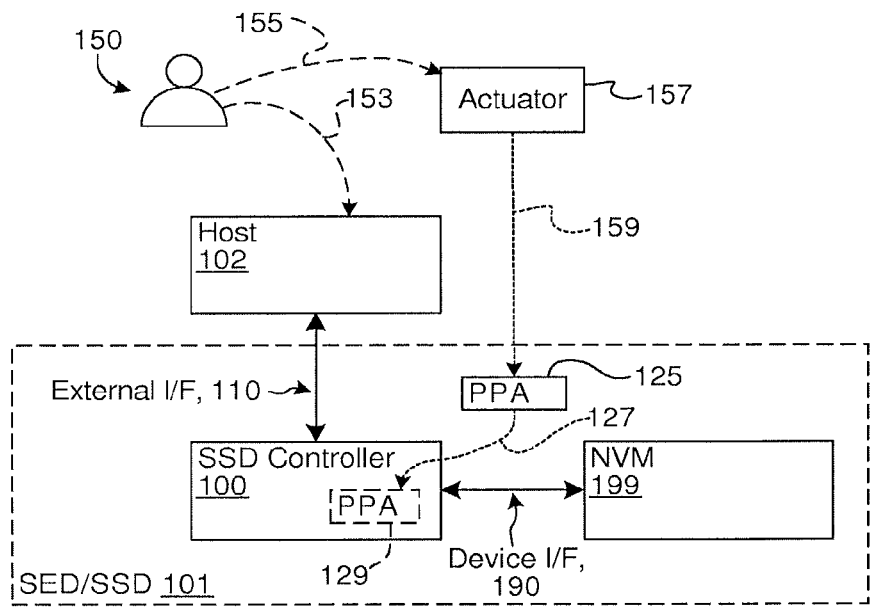
FIG. 1B illustrates selected details of an embodiment of a system including the SED/SSD of FIG. 1A, and further illustrating user system interaction.

FIG. 1B illustrates selected details of an embodiment of a system including the SED/SSD of FIG. 1A. SED/SSD 101 includes SSD controller 100 coupled to NVM 199 via device interfaces 190. The SED/SSD is coupled to host 102 via external interfaces 110. In some embodiments, SED/SSD 101 (or variations thereof) corresponds to a SAS drive or a SATA drive that is coupled to an initiator operating as host 102.

FIG. 1B also illustrates an example of a user taking ownership of the secure storage device, SED/SSD 101. User 150 has interaction 153 with host 102 to enable security of storage device SED/SSD 101. User 150 provides PPA to the storage device via interaction 155 with actuator 157, predetermined proof action 159, acting upon PPA sensor 125 located within SED/SSD 101, and connected via PPA connection 127 with PPA control 129 located within SSD Controller 100. An example of such user physical interaction is PPA sensor 125 is a momentary switch, actuator 157 is a needle-like rod (e.g., a straightened paper clip), and the user uses the rod to reach through an access hole on the storage device to operate the momentary switch in a predetermined manner (such as one or more switch closures).

Figure 1C:
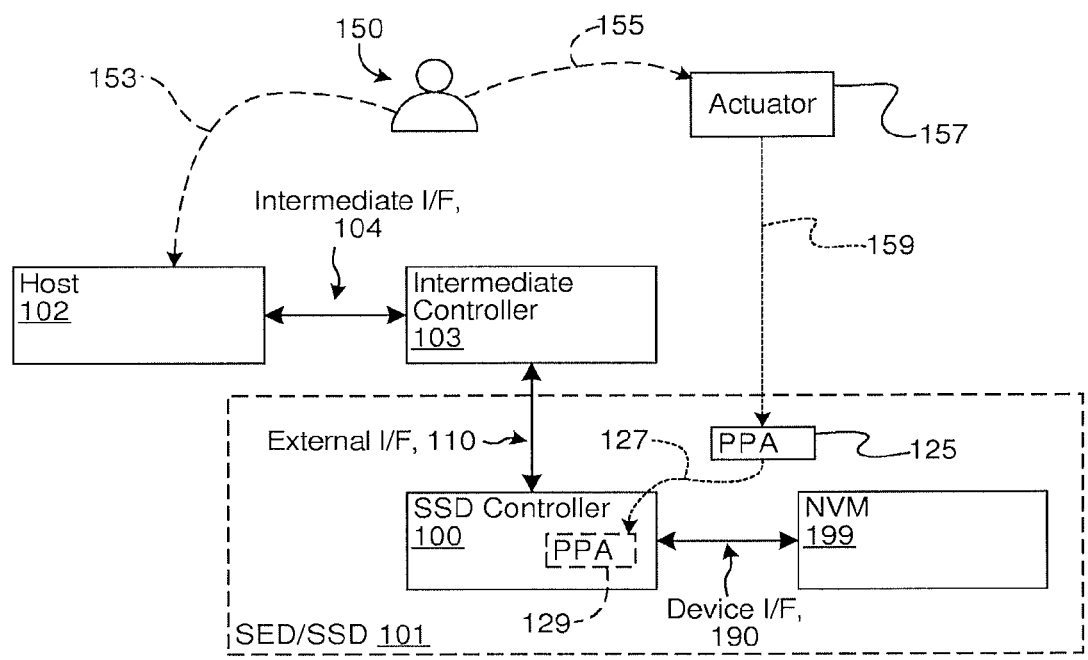
FIG. 1C illustrates selected details of an embodiment of a system including the SED/SSD of FIG. 1A, and further illustrating user system interaction.

FIG. 1C illustrates selected details of an embodiment of a system including the SSD of FIG. 1A. As in FIG. 1B, SED/SSD 101 includes SSD controller 100 coupled to NVM 199 via device interfaces 190. The SSD is coupled to host 102 via external interfaces 110 in turn coupled to intermediate controller 103 and then to host 102 via intermediate interfaces 104. In various embodiments, SSD controller 100 is coupled to the host via one or more intermediate levels of other controllers, such as a RAID controller. In some embodiments, SED/SSD 101 (or variations thereof) corresponds to a SAS drive or a SATA drive and intermediate controller 103 corresponds to an expander that is in turn coupled an initiator, or alternatively intermediate controller 103 corresponds to a bridge that is indirectly coupled to an initiator via an expander. The details with respect to a user enabling storage device security and providing PPA are identical to those illustrated with respect to FIG. 1B and are not repeated here.

In various embodiments, an SSD controller and/or a computing-host flash memory controller in combination with one or more NVMs are implemented as a non-volatile storage component, such as a USB storage component, a CF storage component, an MMC storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., host 102 of FIG. 1C). In various embodiments, all or any portions of an SSD controller (or a computing-host flash memory controller), or functions thereof, are implemented via hardware (e.g., logic circuitry), software (e.g., driver program), or any combination thereof. For example, functionality of or associated with an ECC unit (such as similar to ECC 161 and/or ECC-X 135 of FIG. 1A) is implemented partially via software on a host and partially via hardware in an SSD controller. For another example, functionality of or associated with a recycler unit (such as similar to recycler 151 of FIG. 1A) is implemented partially via software on a host and partially via hardware in a computing-host flash memory controller.

Embodiments of Proof of Physical Access to Storage Device

Figures 2, 3:
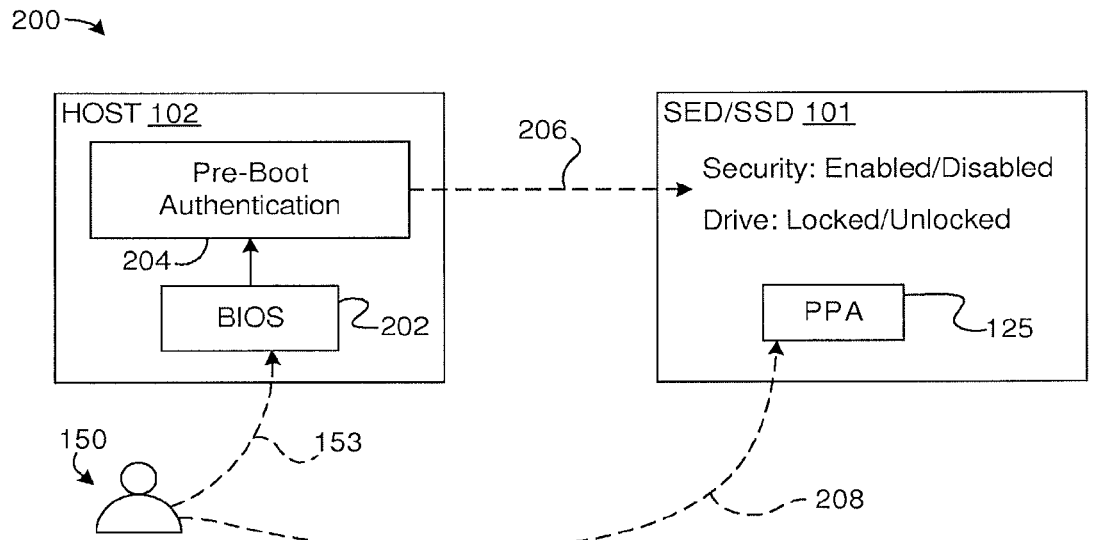
FIG. 2 illustrates user interaction with a host BIOS for enabling SED/SSD security and unlocking a secured drive, and a PPA with respect to the systems of FIGS. 1B and 1C.
FIG. 3 is a table illustrating SED/SSD behavior relative to whether security is enabled and whether a secure drive has been unlocked.

FIG. 2 illustrates user interaction with a host BIOS for enabling SED/SSD security and unlocking a secured drive, and a PPA with respect to the systems of FIGS. 1B and 1C.

In some scenarios, user 150 has interaction 153 with host 102 immediately following a power-ON sequence. In an example, depicted generally by reference numeral 200, at power-ON the user is permitted to modify Host BIOS 202 by selecting and entering a nonblank user password into BIOS flash memory. Following the Host BIOS modification, and before startup of the host operating system, a pre-boot authentication process 204 sends the nonblank password from the Host BIOS to SED/SSD 101, as indicated conceptually by dashed-arrow 206. The pre-boot authentication process enables storage device security and unlocks the storage device to accept storage commands issued from, e.g., the host operating system. Once security is enabled, SED/SSD 101 will accept and execute all storage commands that read and write data. According to various embodiments, however, anyone or more of commands that attempt to change the password, erase a portion of the storage device, format the storage device, execute a sanitizing or trim operation, and the like, are not executed until the user provides proof 208 of actual physical access to the storage device by operating storage device sensor 125 in a predetermined manner.

FIG. 3 is a table illustrating storage device behavior relative to whether security is enabled and whether a secure drive has been unlocked. The table is depicted generally by reference numeral 300 and includes allowable combinations of two parameters: Security Enabled, and Drive Locked. As described above with respect to the example of FIG. 2, storage device security, in some scenarios, is enabled during a pre-boot transfer of a non-blank password. When security has not been enabled, the storage device is not locked and non-selectively executes all commands received (Execute all CMDs, 301). Once security has been enabled however, the storage device is in a locked state, unresponsive to optionally and/or selectively some and/or all commands, following a power-ON sequence until a correct password has been received from the host (Wait for correct Credentials to unlock, 303). Then the storage device becomes unlocked and ready to selectively execute storage device commands (Execute all unprotected CMDs; execute protected CMDs only when PPA present, 302).

Figure 4:
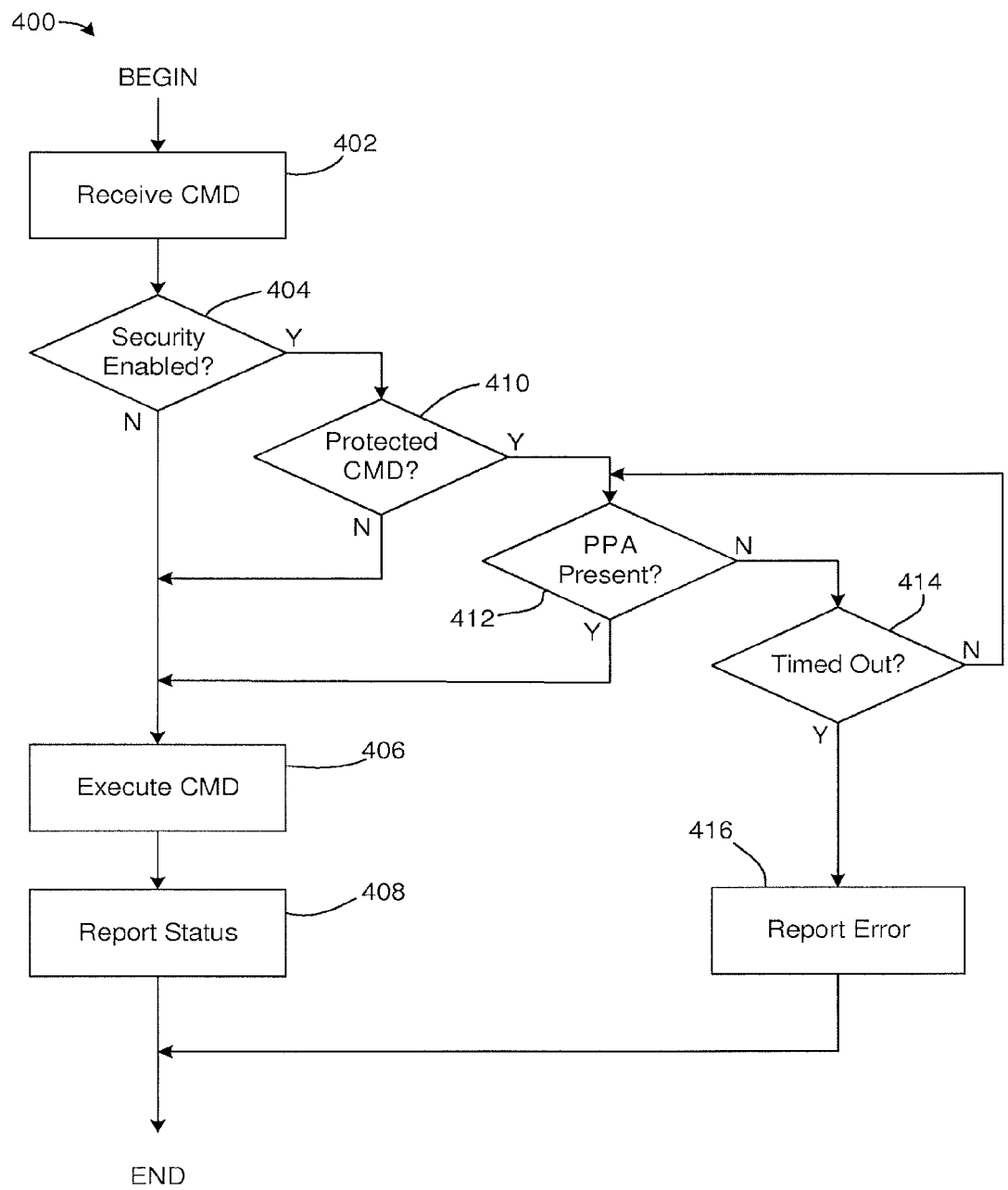
FIG. 4 illustrates a decision tree used by a secure storage device, such as the SED/SSD of FIGS. 1A-1C, during execution of received commands.

FIG. 4 illustrates a decision tree used by a secure storage device, such as the SED/SSD of FIGS. 1A-1C, during execution of received commands. The decision tree is depicted generally by the reference numeral 400. When a (storage device) command is received 402, a test 404 is made to determine whether security is enabled. If security is not enabled, the received command is executed 406, status is reported 408 to the host, and the storage device has completed processing of the received command.

Once determined that security is enabled, the received command is tested 410 to determine whether it is one of a plurality of protected commands. Examples of protected commands are "Changing Existing Credentials," "Erasing a Defined Portion of the Drive," "Formatting the Drive," and "Performing a Sanitizing or Trim Operation," or any combination thereof. In various embodiments, protected commands are any combination of the foregoing examples. If the received command is not protected, then the command is executed 406 and status is reported 408 to the host. If the received command is a protected command, then a test 412 is made to determine whether PPA is present. In some scenarios, the proof includes a direct physical user interaction with the storage device such as illustrated in FIGS. 1B, 1C, and 2. If the proof is present, then the received command is executed 406 and status is reported 408 to the host. When PPA is not immediately present, a proof window of time is established for a proof to occur in. The window provides, e.g., a user time to obtain or to create an actuator (such as 157 of FIGS. 1B and 1C) and to begin a predetermined physical interaction with the storage device. In some embodiments and/or usage scenarios, the predetermined physical interaction is relatively simple, having only a single user interaction, while in other embodiments and/or usage scenarios the predetermined physical interaction is relatively complex, having multiple phases and specific user interactions. Various proof windows are represented as a test 414 for a time out. If the proof window has not timed out, then the storage device continues to wait for PPA to be present (test 412). When the proof window has timed out without PPA having become present, an error is optionally and/or selectively reported 416 to the host.

In some embodiments and/or usage scenarios, CPU 171 of FIG. 1A executes instructions (such as fetched from instances of flash device 192 of FIG. 1A) that manage, control, and/or perform all or any portions of functions illustrated in FIG. 4 and/or functions performed in conjunction with PPA control 129 of FIG. 1A. For example, anyone or more of tests 404, 410, 412, and 414 are performed in whole or in part by CPU 171. In some embodiments, command management 173 of FIG. 1A manages, controls, and/or performs all or any portions of functions illustrated in FIG. 4 and/or functions performed in conjunction with PPA control 129 of FIG. 1A. For example, anyone or more of tests 404, 410, 412, and 414 are performed in whole or in part by command management 173, optionally in conjunction with instructions fetched from instances of flash device 192 and executed by CPU 171. For another example, command management 173 recognizes PPA based at least in part on information provided by PPA control 129.

FIGS. 5A-5D illustrate examples of various PPA sensors 125A-D, corresponding activators, and corresponding predetermined user interactions for proving physical access to SED/SSD 101 of FIGS. 1A-1C. Each of PPA sensors 125A-D is a respective example embodiment of PPA sensor 125 of FIGS. 1B, 1C, and 2. FIG. 5E illustrates SED/SSD 101 of FIGS. 1A-1C wherein PPA is established by a physically secure connection with a host system.

Figure 5A:
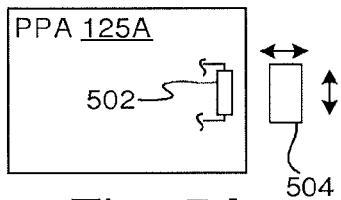
FIG. 5A illustrates a user-actuated PPA including a magnetically operated reed switch located within the SED/SSD of FIGS. 1A-1C.

In FIG. 5A, PPA sensor 125A includes a magnetically operated reed switch 502 within a storage device (such as SED/SSD 101) and operable by user-manipulated external magnet 504. Within a proof window of time, a user brings the magnet in proximity to the reed switch to provide PPA of the storage device. In an example where the storage device is installed in a laptop computer, the user passes the magnet along the underside of the computer to activate the reed switch. In some embodiments and/or usage scenarios, a predetermined user interaction that includes a relatively more complex sequence of switch openings and closings (with respect to time) provides PPA.

Figure 5B:
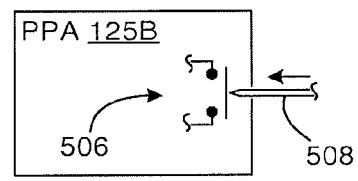
FIG. 5B illustrates a user-actuated PPA including a manually operated momentary switch located within the SED/SSD of FIGS. 1A-1C.

In FIG. 5B, PPA sensor 125B includes a momentary switch 506 within a storage device (such as SED/SSD 101) and operable by user-manipulated needle-like rod 508 (e.g., a straightened paper clip) via an opening in an enclosure of the storage device. Other modes of operating momentary switch 506 are contemplated. Within a proof window of time, a user inserts the rod into the opening and then presses the rod to operate the switch to provide PPA of the storage device. In some embodiments and/or usage scenarios, a predetermined user interaction that includes a relatively more complex sequence of switch openings and closings (with respect to time) provides PPA.

Figure 5C:
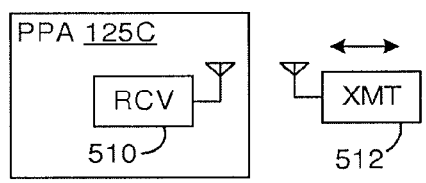
FIG. 5C illustrates a user-actuated PPA including a receiver enabled to detect presence of a pre-determined radio signal, the receiver located within the SED/SSD of FIGS. 1A-1C.

In FIG. 5C, PPA sensor 125C includes compatible radio-frequency receiver/detector 510 within a storage device (such as SED/SSD 101) and compatible with external user-manipulated radio-frequency transmitter 512. Within a proof window of time, a user manipulates the transmitter with respect to the receiver to provide PPA of the storage device. In some embodiments and/or usage scenarios, a predetermined user interaction that includes a relatively more complex sequence of movements (with respect to time and/or position) provides PPA. In a specific example, the user employs a cell phone as the radio transmitter and moves it in a defined pattern with respect to SED/SSD 101.

Figure 5D:
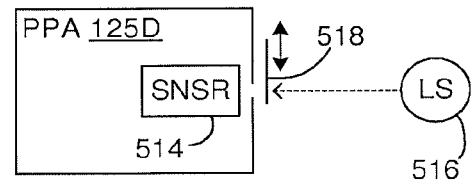
FIG. 5D illustrates a user-actuated PPA including a light sensor, located within the SED/SSD of FIGS. 1A-1C, and enabled to detect a pre-determined change in a light source.
Figure 5E:
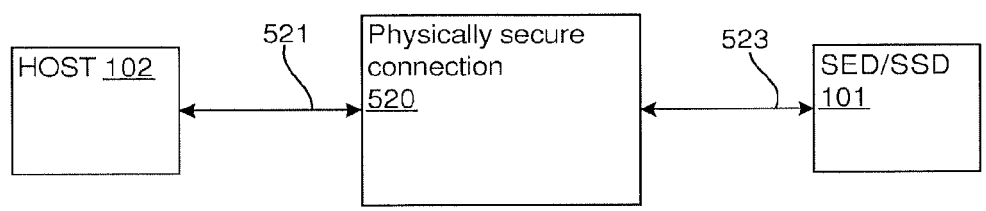
FIG. 5E illustrates the SED/SSD of FIGS. 1A-1C wherein PPA is established by a physically secure connection with a host system.

In FIG. 5D, PPA sensor 125D includes light sensor 514 within a storage device (such as SED/SSD 101) and enabled to detect light source 516. User-manipulated light source interrupter 518 (e.g. a shutter) is configured to selectively admit the light source to the sensor and to selectively interrupt the light source from reaching the sensor. Changes in detected light at the sensor correspond to movements of the interrupter. Within a proof window of time, a user moves and/or manipulates the interrupter to provide PPA of the storage device. In some embodiments and/or usage scenarios, a predetermined user interaction that includes a relatively more complex sequence of movements (with respect to time) provides PPA. As a specific example, fiber optics receive ambient light at the upper face of a laptop when the cover is open, and light is cut off to the sensor when the cover is closed. The user interaction includes a predetermined sequence of opening and shutting the laptop cover during a proof window.

In FIG. 5E, PPA is established by a physically secure connection with a host system. In a specific embodiment, the proof is continuously present while the connection exists. In another embodiment, the proof is present during defined intervals. Host 102 is coupled to physically secure connection 520 via host to physically secure connection coupling 521. Host to physically secure connection coupling 521 is coupled to SED/SSD 101 via physically secure connection to SED/SSD coupling 523. In various embodiments, host to physically secure connection coupling 521 is all or any portion of intermediate interfaces 104, an interface separate from the intermediate interfaces, or a management connection. Examples of the management connection include an I2C interface connection, a UART interface connection, and an Ethernet interface connection (such as GigE). In some embodiments, physically secure connection to SED/SSD coupling 523 is compatible with host to physically secure connection coupling 521. For example, couplings 521 and 523 couple to respective I2C (or UART) interfaces of the host and the SED/SSD, and physically secure connection 520 is one or more wires known by a user to be physically secure. For another example, couplings 521 and 523 couple to respective Ethernet interfaces of the host and the SED/SSD, and physically secure connection 520 is one or more of one or more Ethernet cables, an Ethernet compatible router, and an Ethernet compatible switch known by the user to be physically secure. In some embodiments, physically secure connection to SED/SSD coupling 523 is all or any portion of external interfaces 110.

The description of anti-hijacking techniques has focused largely upon use in connection with self-encrypting, solid-state drives such as SED/SSD 101 of FIGS. 1A-1C It is contemplated, however, that the techniques have useful application with a broad range of secure storage devices such as Hard Disk Drives, Solid State Drives, network devices with internal storage, intelligent appliances, and the like.

Example Implementation Techniques

In some embodiments, various combinations of all or portions of operations performed by an SED/SSD, e.g., with flash memories, a computing-host flash memory controller, and/or an SSD controller (such as SSD controller 100 of FIG. 1A), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments, some, all, or various portions of the program instructions are realized as one or more functions, routines, sub-routines, in-line routines, procedures, macros, or portions thereof.

CONCLUSION

Certain choices have been made in the description merely for convenience in preparing the text and drawings, and unless there is an indication to the contrary, the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A storage device comprising:
    a non-volatile memory;
    a Proof of Physical Access (PPA) mechanism which generates a PPA value responsive to a direct physical user interaction with the storage device; and
    a controller circuit configured to, responsive to receipt of a storage command from a host, execute the received storage command responsive to the storage command being determined to be a protected command and responsive to detection of the PPA value during a predetermined window of time, the controller circuit further configured to not execute the received storage command responsive to the storage command being determined to be a protected command and responsive to an absence of the PPA value during the predetermined window of time, the protected command comprising a command that changes access to data stored in the non-volatile memory.

2. The storage device of claim 1, wherein the protected command comprises at least a selected one of a command to change security credentials for the storage device, a command to format the storage device, or a command to perform a solid-state drive TRIM operation.

3. The storage device of claim 1, wherein the controller circuit is further configured to execute the received storage command responsive to a determination that the received storage command is not a protected command.

4. The storage device of claim 1, wherein the PPA mechanism magnetically interacts with a magnetic field established during the direct physical user interaction to generate the PPA value.

5. The storage device of claim 1, wherein the PPA mechanism comprises a switch located within a housing of the storage device that is configured to be activated during the direct physical user interaction to generate the PPA value.

6. The storage device of claim 1, wherein the PPA mechanism comprises a radio frequency receiver/detector which receives a wireless signal transmitted by a user device proximate the storage device during the direct physical user interaction to generate the PPA value.

7. The storage device of claim 1, wherein the PPA mechanism comprises a light source that generates a light beam which is interrupted during the direct physical user interaction to generate the PPA value.

8. The storage device of claim 1, wherein the controller circuit comprises a programmable processor having associated programming in a local processor memory which, when executed, detects the received storage command and detects the PPA value.

9. The storage device of claim 1, wherein the controller circuit is further configured to detect activation of a security protocol associated with the storage device and determine whether the received storage command is a protected command responsive to detected activation of the security protocol.

10. The storage device of claim 1, characterized as a solid state drive (SSD) and the non-volatile memory is characterized as flash memory.

11. The storage device of claim 1, characterized as a hard disk drive (HDD) and the non-volatile memory is characterized as a rotatable magnetic recording medium.

12. A solid state drive (SSD) comprising:
    a non-volatile main memory;
    a Proof of Physical Access (PPA) mechanism which generates a PPA value responsive to a direct physical user interaction with the storage device; and
    controller circuitry coupled to the non-volatile main memory and the PPA mechanism and configured to receive a storage command from a host, to detect activation of a security protocol for the SSD, to determine whether the received storage command is a protected command responsive to the detected activation of the security protocol, to execute the received storage command responsive to the received storage command being a protected command and responsive to detection of the PPA value within a predetermined elapsed time interval, and to not execute the received storage command responsive to the received storage command being a protected command responsive to an absence of the PPA value within the predetermined elapsed time interval, the protected command comprising a command that changes access to data stored in the non-volatile memory.

13. The SSD of claim 12, wherein the protected command comprises a command to change a security credential, to format the non-volatile main memory, to sanitize the non-volatile main memory, or to deactivate the activation of the security protocol.

14. The SSD of claim 12, wherein the controller circuit is further configured to execute the received storage command responsive to a determination that the received storage command is not a protected command.

15. The SSD of claim 12, wherein the PPA mechanism magnetically interacts with a magnetic field established during the direct physical user interaction to generate the PPA value.

16. The SSD of claim 12, wherein the PRA mechanism comprises a switch located within a housing of the storage device that is configured to be activated during the direct physical user interaction to generate the PPA value.

17. The SSD of claim 12, wherein the PPA mechanism comprises a radio frequency receiver/detector which receives a wireless signal transmitted by a user device proximate the storage device during the direct physical user interaction to generate the PPA value.

18. The SSD of claim 12, wherein the PPA mechanism comprises a light source that generates a light beam which is interrupted during the direct physical user interaction to generate the PPA value.

19. The SSD of claim 12, wherein the controller circuit comprises a programmable processor having associated programming in a local processor memory which, when executed, detects the received storage command and detects the PPA value.

20. The SSD of claim 12, wherein the non-volatile main memory comprises flash memory cells.

* * * * *